US012756253B2

(12) United States Patent
Bartos et al.

(10) Patent No.: US 12,756,253 B2
(45) Date of Patent: Oct. 6, 2026

(54) ELECTRIC ROTATING MACHINE AND METHOD AND VEHICLE COMPRISING ELECTRIC MACHINE

(71) Applicant: Traton AB, Södertälje (SE)

(72) Inventors: Elias Bartos, Huddinge (SE); Usman Afridi, Södertälje (SE)

(73) Assignee: Traton AB, Södertälje (SE)

( * ) Notice: Subject to any disclaimer, the term of this patent is extended or adjusted under 35 U.S.C. 154(b) by 243 days.

(21) Appl. No.: 18/695,062

(22) PCT Filed: Oct. 3, 2022

(86) PCT No.: PCT/SE2022/050882
§ 371 (c)(1),
(2) Date: Mar. 25, 2024

(87) PCT Pub. No.: WO2023/059247
PCT Pub. Date: Apr. 13, 2023

(65) Prior Publication Data
US 2024/0413691 A1 Dec. 12, 2024

(30) Foreign Application Priority Data
Oct. 4, 2021 (EP) .................................... 21200793

(51) Int. Cl.
*H02K 3/24* (2006.01)
*H02K 5/20* (2006.01)

(52) U.S. Cl.
CPC ................. *H02K 3/24* (2013.01); *H02K 5/20* (2013.01)

(58) Field of Classification Search
CPC .......... H02K 9/197; H02K 5/203; H02K 5/20; H02K 3/24; H02K 1/276; H02K 1/02; H02K 1/2766
See application file for complete search history.

(56) References Cited

U.S. PATENT DOCUMENTS 7,952,240 B2 * 5/2011 Takenaka ................. H02K 1/20 310/58
8,269,382 B2 9/2012 Nakamori et al.
(Continued)

FOREIGN PATENT DOCUMENTS

DE 102017221803 A1 6/2019
EP 2461463 A1 6/2012
(Continued)

OTHER PUBLICATIONS

Scania CV AB, International Patent Application No. PCT/SE2022/050882, International Preliminary Report on Patentability, Apr. 9, 2024.
(Continued)

*Primary Examiner* — Leda T Pham

(74) *Attorney, Agent, or Firm* — Moore & Van Allen PLLC; W. Kevin Ransom

(57) ABSTRACT

The disclosure concerns an electric rotating machine, comprising a stator, a rotor arranged to rotate about a rotational axis in relation to the stator, and a cooling system for cooling at least a portion of the stator. The stator comprises a stator core and a stator coil, the stator coil having a coil end winding extending axially beyond the stator core. At least part of the coil end winding is arranged in a channel extending at least partially around the rotational axis. The cooling system comprises the channel and at least one inlet to the channel arranged at a radially inner portion of the channel seen along a radial extension.

11 Claims, 6 Drawing Sheets

(56) References Cited

U.S. PATENT DOCUMENTS

| | | | | |
|---|---|---|---|---|
| 8,421,284 | B2 | 4/2013 | Sugimoto et al. | |
| 2011/0180239 | A1 | 7/2011 | Sugimoto et al. | |
| 2012/0299404 | A1* | 11/2012 | Yamamoto | H02K 1/28 310/61 |
| 2018/0205294 | A1* | 7/2018 | Manabe | H02K 5/1732 |
| 2019/0207457 | A1 | 7/2019 | Hamiti et al. | |
| 2020/0295617 | A1 | 9/2020 | Cunningham et al. | |

FOREIGN PATENT DOCUMENTS

| | | | |
|---|---|---|---|
| JP | 07279975 | A | 10/1995 |
| JP | 09154258 | A | 6/1997 |
| JP | 2013013228 | A | 1/2013 |
| WO | 2011092949 | A1 | 8/2011 |

OTHER PUBLICATIONS

Scania CV AB, European Patent Application No. 22789352.6, Communication pursuant to Rules 161(1) and 162 EPC, May 16, 2024.

Scania CV AB, International Patent Application No. PCT/SE2022/050882, International Search Report, Dec. 23, 2022.

Scania CV AB, International Patent Application No. PCT/SE2022/050882, Written Opinion, Dec. 23, 2022.

Scania CV AB, European Patent Application No. 21200793.4, Extended European Search Report, Mar. 21, 2022.

Scania CV AB, Korean Patent Application No. 10-2024-7008500, Office Action, Feb. 7, 2025.

* cited by examiner

ELECTRIC ROTATING MACHINE AND METHOD AND VEHICLE COMPRISING ELECTRIC MACHINE

CROSS-REFERENCE TO RELATED APPLICATIONS

This application is a National Stage Patent Application (filed under 35 § U.S.C. 371) of PCT/SE2022/050882, filed Oct. 3, 2022, of the same title, which, in turn claims priority to European Patent Application No. 21200793.4 filed Oct. 4, 2021, of the same title; the contents of each of which are hereby incorporated by reference.

TECHNICAL FIELD

The invention relates to an electric rotating machine and to a method for cooling a coil end winding of an electric rotating machine. The invention further relates to a vehicle comprising one or more electric rotating machines.

BACKGROUND

In general, an electric rotating machine comprises a stator and a rotor rotatable about a rotational axis in relation to the stator. At least one of the rotor and stator may be provided with one or more windings. Some electric rotating machines are equipped with a cooling system for one or more of the rotor and stator, since during operation of the electric rotating machine one or more of the rotor and stator may be heated to such a degree that cooling is advisable. The cooling system may guide a coolant such as an oil, or other fluid, in channels to cool one or more of the rotor and stator.

Known cooling systems for cooling a stator coil end winding of an electric rotating machine utilise guiding elements arranged at the end winding. Cooling of the end winding is performed by introducing a coolant at an upper portion of the end winding, wherefrom assisted by the guiding elements, gravity will feed the coolant along/through the end winding for cooling thereof.

Three examples of such cooling of stator coil end windings are disclosed in:

EP 2461463, which relates to a refrigerant supply port through which a cooling medium is supplied to a coil end and a guide member for causing the cooling medium supplied through the refrigerant supply port to flow along the coil end.

U.S. Pat. No. 8,269,382, which relates to a cooling medium introducing gap formed above a portion of a coil end portion to which the cooling medium is to be supplied. The cooling medium is supplied to the coil end portion through discharge openings provided in a storage space forming member.

And US 2011/180239, which relates to a cooling structure with a cooling medium distributing member formed with a plurality of discharge openings. The cooling medium distributing member is arranged above a stator coil end winding.

SUMMARY

In such prior art gravity fed cooling of a stator coil end winding, a coolant will flow along the path of least resistance along/through the coil end winding.

The inventors have realized that regions of the coil end wiring that are reached by a coolant fed by gravity through/along the coil end winding are not necessarily the warmest regions of the coil end winding. Since the warmest parts of the coil end winding determine the operating temperature of the electric machine, it has been realized by the inventors that a more precise guiding of the coolant to the warmest regions of the coil end winding will provide a more efficient cooling of the electric machine, which will provide better operating conditions for the electric rotating machine and which even may increase an available power output of the electric rotating machine.

Accordingly, it would be advantageous to improve cooling of an electric rotating machine. In particular, it would be desirable to enable an efficient cooling of a stator coil end winding of an electric rotating machine. To better address one or more of these concerns, an electric rotating machine and/or a method for cooling a coil end winding of an electric rotating machine and/or a vehicle comprising one or more electric rotating machines having the features defined in one or more of the independent claims is/are provided.

According to an aspect of the invention, there is provided an electric rotating machine, comprising a stator, a rotor arranged to rotate about a rotational axis in relation to the stator, and a cooling system for cooling at least a portion of the stator. A radial extension extends perpendicularly to the rotational axis. The stator comprises a stator core and a stator coil, the stator coil having a coil end winding extending axially beyond the stator core. At least part of the coil end winding is arranged in a channel extending at least partially around the rotational axis. The cooling system comprises the channel and at least one inlet to the channel arranged at a radially inner portion of the channel seen along the radial extension.

Since the cooling system comprises the channel extending at least partially around the rotational axis and the at least one inlet to the channel arranged at a radially inner portion of the channel, the coolant will enter the channel at a portion thereof where the coil end winding is the warmest during use of the electric rotating machine.

More specifically, the portion of the coil end winding with the highest losses is the portion closest to the air gap between the stator and the rotor. Accordingly, turns of the coil end winding closest to the air gap i.e., the radially innermost turns of the coil end winding have the highest losses and therefore, form the warmest portions of the coil end winding during use of the electric rotating machine.

Due to the invention, a precise guiding of the coolant to the warmest regions of the coil end winding provides an efficient cooling of the electric machine. Good operating conditions are thus, provided for the electric rotating machine, which also may increase an available power output of the electric rotating machine.

The electric rotating machine may form part of a propulsive system of a vehicle. The electric rotating machine may drive the vehicle and/or the electric rotating machine may form a generator for transforming kinetic energy of the vehicle into electric power to be utilised for charging a battery. Electric energy may be provided to the electric rotating machine from a battery aboard the vehicle or from a power source external of the vehicle, such as an overhead power line or a rail arranged in or at a surface travelled by the vehicle.

The electric rotating machine may herein alternatively be referred to simply as the electric machine.

The rotor of the electric machine may be directly or indirectly connected to an output shaft of the electric machine.

The stator coil has at least one winding. The at least one winding comprises a number of turns. As mentioned above, the stator coil has a coil end winding i.e., that portion of the stator winding which extends axially outside the stator core.

The coil end winding is herein also referred to as a stator coil end winding or simply, as an end winding.

The cooling system is configured for cooling at least the coil end winding during use of the electric rotating machine. The cooling system may be configured for cooling further portions of the electric rotating machine.

The cooling system is configured for guiding a coolant such as an oil, or other fluid, along and/or through the coil end winding. That is, the coolant will flow along and/or through the individual turns of the coil end winding. The cooling system may comprise further conduits, passages, paths, and the like for conducting the coolant to and from the channel.

The channel may be a space separate from a rotor compartment of the electric machine i.e., separate from a space wherein the rotor is arranged.

The channel extending at least partially around the rotational axis may extend partially of fully circumferentially around the rotational axis. The channel thus, may be a ring-shaped channel. In embodiments wherein the channel extends partially around the rotational axis, one or more further channels may be arranged extending partially around the rotational axis. Together, such channels extending partially around the rotational axis may form a ring-shaped sequence of channels.

The at least one inlet to the channel being—arranged at a radially inner portion of the channel seen along the radial extension—means that the at least one inlet extends in a radial direction from outside the channel into the channel and/or that the at least one inlet extends in an axial direction from outside the channel into the channel. In both cases, the at least one inlet is arranged at a radially inner portion of the channel seen along the radial extension. The radially inner portion may be a radially inner quarter of the channel, or a radially inner third of the channel, or a radially inner half of the channel.

An axial direction/extension extends in parallel with the rotational axis of the electric machine.

According to embodiments, the at least one inlet to the channel may be arranged at an axial half of the channel closest to the stator core. In this manner, the coolant may be directed into a portion of the channel closest to the air gap of the electric rotating machine i.e., closest to the air gap seen along the rotational axis. Thus, the coolant may be supplied to the warmest portion of the end winding, not only in a radially warmest portion of the end winding but also in an axially warmest portion of the end winding.

According to embodiments, the at least one inlet to the channel may comprise more than one inlet distributed along a circumference of the channel. In this manner, the coolant may be supplied to the end winding in more than one circumferential position of the channel. Thus, cooling of the coil end winding may be further improved.

Depending on where along the radially inner portion of the channel the more than one inlet is arranged, the inlets may be arranged along an inner circumference of the channel and/or along an axial circumference of the channel.

According to embodiments, the cooling system may comprise one or more passages arranged upstream of the channel, and the at least one inlet to the channel may be fluidly connected to the one or more passages. In this manner, the coolant may be supplied efficiently to the at least one inlet and the channel.

Herein, the terms upstream and downstream relate to the cooling system and a flow direction of the coolant therein during use of the electric rotating machine. Accordingly, upstream the channel is before the channel seen along a flow direction of the coolant in the cooling system.

According to embodiments, the cooling system may comprise at least one outlet from the channel arranged at a radially outer portion of the channel seen along the radial extension. In this manner, the coolant may be directed in a general sense from a radially inner portion of the channel towards a radially outer portion thereof. Accordingly, the coolant may flow from a warmest region of the end winding towards a coolest region thereof as it flows through the channel. Thus, cooling of the coil end winding may be further improved.

The radially outer portion may be a radially outer quarter of the channel, or a radially outer third of the channel, or a radially outer half of the channel.

According to embodiments, the coil end winding may be arranged at the radially inner portion of the channel. The channel may extend radially outside the coil end winding, forming in the channel an unblocked portion of the channel radially outside of the coil end winding seen along the radial extension. The unblocked portion may extend at least partially circumferentially around the coil end winding. In this manner, there may be provided an at least partial circumferential flow path to the outlet radially outside the end winding i.e., downstream of the coil end winding, seen in a flow direction of the coolant through the channel. Thus, coolant that has passed through the coil end winding may be readily conducted to the outlet from the channel.

According to a further aspect of the invention, there is provided a method for cooling a coil end winding of an electric rotating machine. The electric machine comprises a stator, a rotor arranged to rotate about a rotational axis in relation to the stator, and a cooling system for cooling at least the coil end winding. A radial extension extends perpendicularly to the rotational axis. The stator comprises a stator core and a stator coil, the stator coil comprising the coil end winding which extends axially beyond the stator core, wherein at least part of the coil end winding is arranged in a channel extending at least partially around the rotational axis, and wherein the cooling system comprises the channel. The method comprises steps of:

- supplying a coolant to the channel at a radially inner portion of the channel, and
- directing the coolant radially outwardly through the coil end winding.

Since the coolant is supplied to the channel at a radially inner portion of the channel and directed radially outwardly through the coil end winding, the coolant will enter the channel at a portion thereof where the coil end winding is the warmest during use of the electric rotating machine. Accordingly, it is ensured that the coolant is directed to the coil end winding where the coolant is most efficiently utilised for cooling of the coil end winding.

According to a further aspect of the invention, there is provided a vehicle comprising one or more electric rotating machines according to any one of aspects and/or embodiments discussed herein.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1:
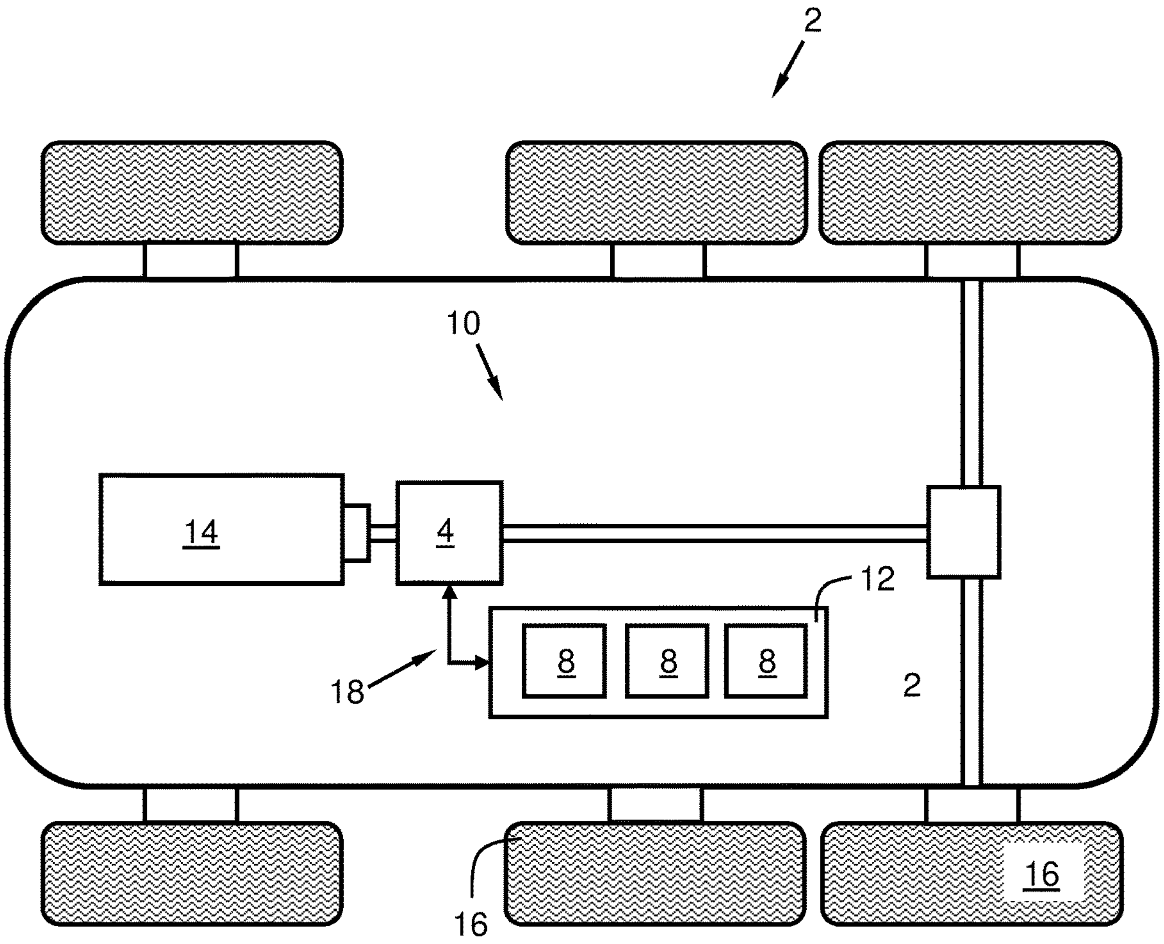
FIG. 1 illustrates embodiments of a vehicle configured for land-based propulsion.

FIG. 1 illustrates embodiments of a vehicle 2 configured for land-based propulsion. FIG. 1 represents a schematic cross sectional top view of the vehicle 2. The vehicle 2 comprises one or more electric rotating machines 4 according to aspects and/or embodiments discussed herein, such as the electric rotating machine 4 discussed below with reference to FIGS. 2-5*g*. Part of the electric rotating machine 4 may be cooled in accordance with a method as discussed herein, inter alia with reference to FIG. 6.

In these embodiments, the vehicle 2 is a heavy load vehicle in the form of a truck. However, the invention is not limited to any particular type of vehicle configured for land-based propulsion. The vehicle 2 may be e.g., a bus, a truck, a heavy truck, a car, or a train. The vehicle may also be of another type. The vehicle 2 may be an electric vehicle, EV, for example a hybrid vehicle or a hybrid electric vehicle, HEV, or a battery electric vehicle, BEV. It is to be noted that the herein discussed electric rotating machine may be utilised in further means of transportation, such as in boats or other marine vessels.

The one or more electric rotating machines 4 may comprise one or more electric motors and/or one or more electric generators. The one or more electric rotating machines 4 may be configured for propelling the vehicle 2. The one or more electric rotating machines 4 may be configured for charging one or more electric battery cells 8 and/or one or more electrical battery packs 12.

The vehicle 2 may comprise a powertrain 10, for example configured for one of an EV, HEV and BEV. The vehicle 2 may comprise one or more electrical battery packs 12 including two or more electric battery cells 8. The electrical battery pack 12 may be attachable to a chassis of the vehicle 2. The vehicle 2 may include further electrical and/or mechanical components e.g., a combustion engine 14 and other devices required for a vehicle 2, such as for an EV, HEV, or BEV.

The powertrain 10 and/or the one or more electric rotating machines 4 is/are configured to propel, or drive, the vehicle 2. The powertrain 10 may include the electrical battery pack 12. The one or more electric rotating machines 4 may be arranged in other positions of the vehicle 2 than shown in FIG. 1. For example, in connection with one or more wheels 16 of the vehicle 2 or in connection with the combustion engine 14 to operate as an electric generator.

The vehicle 2 may comprise an electrical system 18. The electrical system 18 may be configured for direct current. The electrical system 18 may be a low voltage system such as a 24 Volt system. The electrical system 18 may be a higher voltage system configured for a high voltage such as 48 V or a voltage of 60 V or above for example, above 400 V, or above 450 V, such as above 650 V. For example, the high voltage system may be configured for a voltage up to 1500 V and/or for a voltage above 1500 V. The electric power, or the electric current, for example the direct current, of the electrical system 18 may be transferred for example, at one or more of the voltage levels mentioned above.

The electrical system 18 may be electrically connected, or connectable, to one or more electrical battery packs 12. The electrical battery packs 12 may be configured for one or more of the voltage levels mentioned above.

The electrical system 18 may be configured to electrically connect the electrical battery pack 12 to the powertrain 10 of the vehicle 2. The electrical system 18 may be configured to electrically connect the electrical battery pack 12 to the one or more electric rotating machines 4 of the vehicle 2. The vehicle electrical system 18 may be configured to transfer electric power, or electric current, e.g., between the one or more electric rotating machines 4 and/or the powertrain 10 and/or the electrical battery pack 12.

Alternatively, the electrical system 18 may be configured for alternating current. A further option may be for the electrical system 18 to be configured in part for direct current and in part for alternating current.

According to some embodiments, the electrical system 18 may be fed from an electrical power source external of the vehicle 2, such as an overhead power line or a powered rail arranged in, or at, a travelling surface.

Figure 2:
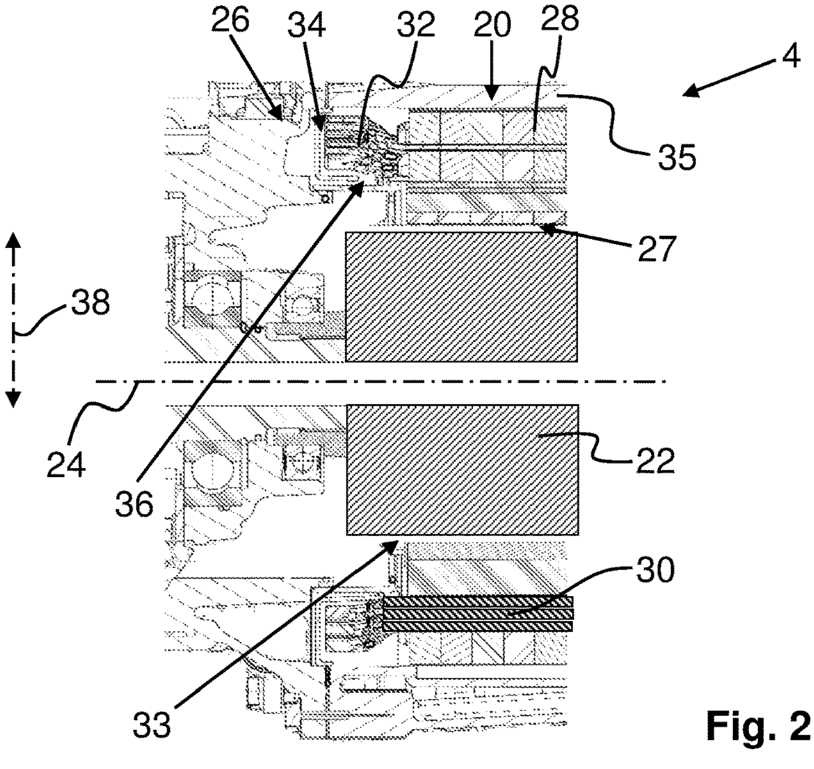
FIG. 2 illustrates a cross section through a portion of an electric rotating machine according to embodiments, FIG. 3 schematically illustrates a cooling arrangement according to embodiments.

FIG. 2 illustrates a cross section through a portion of an electric rotating machine 4 according to embodiments. The electric rotating machine 4 may form part of a vehicle, such as a vehicle 2 discussed above with reference to FIG. 1.

The electric rotating machine 4 may be operated as an electric motor e.g., for propelling a vehicle and/or as an electric generator e.g., for charging one or more electric battery cells and/or one or more electrical battery packs.

The electric rotating machine 4 comprises a stator 20, a rotor 22 arranged to rotate about a rotational axis 24 in relation to the stator 20, and a cooling system 26 for cooling at least a portion of the stator 20. An air gap 27 is formed between the stator 20 and the rotor 22.

The stator 20 comprises a stator core 28 and a stator coil 30, the stator coil 30 having a coil end winding 32 extending axially beyond the stator core 28. The stator coil 30 may include one or more stator windings. The one or more stator windings may include one or more coil end windings 32.

The rotor 22 may include one or more permanent magnets. Thus, the electric rotating machine 4 may be a permanent magnet, PM, machine. According to alternative embodiments, the electric rotating machine 4 may be configured to operate according to other electrical operation schemes for electric rotating machines. For example, the rotor 22 may include one or more rotor windings. Conventional electrical operation schemes for electric rotating machines are known to the skilled person and are thus not discussed herein in further detail.

The rotor 22 is arranged in a rotor compartment 33. The rotor compartment 33 is formed in a housing 35 of the electric rotating machine 4. In the housing 35, also the stator 20 and the rotor 22 are arranged. The rotor 22 may be directly or indirectly journalled in the housing 35 e.g., via one or more ball bearings.

At least part of the coil end winding 32 is arranged in a channel 34 extending at least in part circumferentially around the rotational axis 24. The channel 34 may be formed by annular wall sections 69 of the housing 35. The channel 34 may be further delimited by a guiding member 54 as illustrated with example embodiments in FIG. 2 and in FIG. 4*c*.

The cooling system 26 may be configured for cooling at least a portion of the stator 20 but may be configured for cooling the stator 20 in general. A coolant, such as oil or an oil mixture, may be directed through the cooling system 26 in order to cool at least the end winding 32. The cooling system 26 may include one or more channels, conduits, passages, and/or lines, for guiding the fluid to and from at least the coil end winding 32.

Figure 4A:
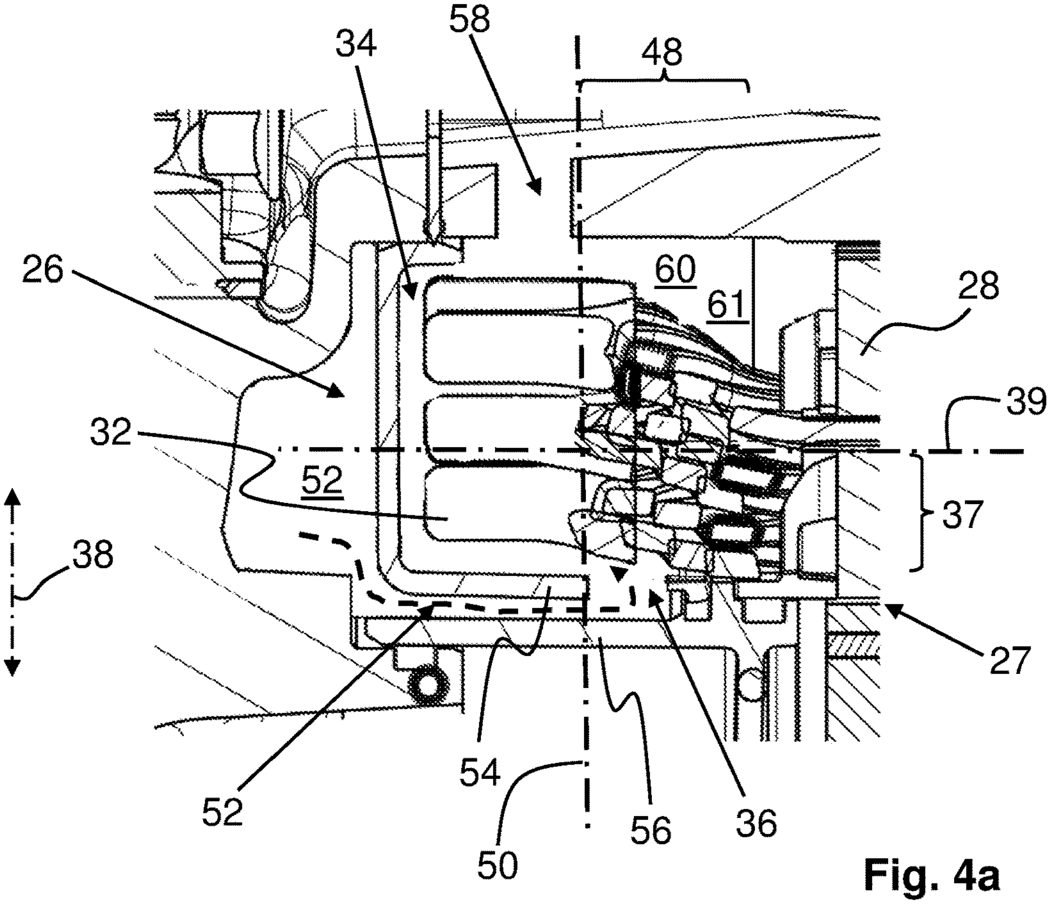
FIGS. 4*a* and 4*b* and 4*c* illustrates partial cross sections through an electric rotating machine.
Figure 4B:
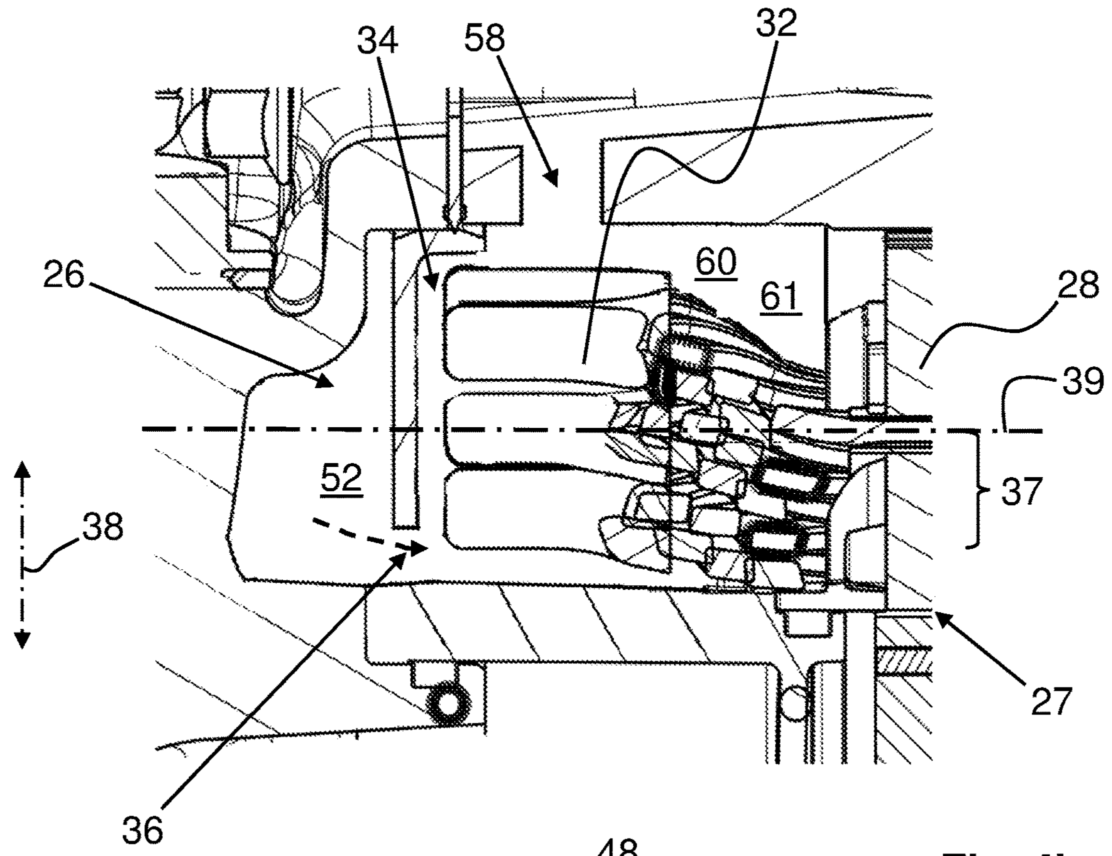
Figure 4C:
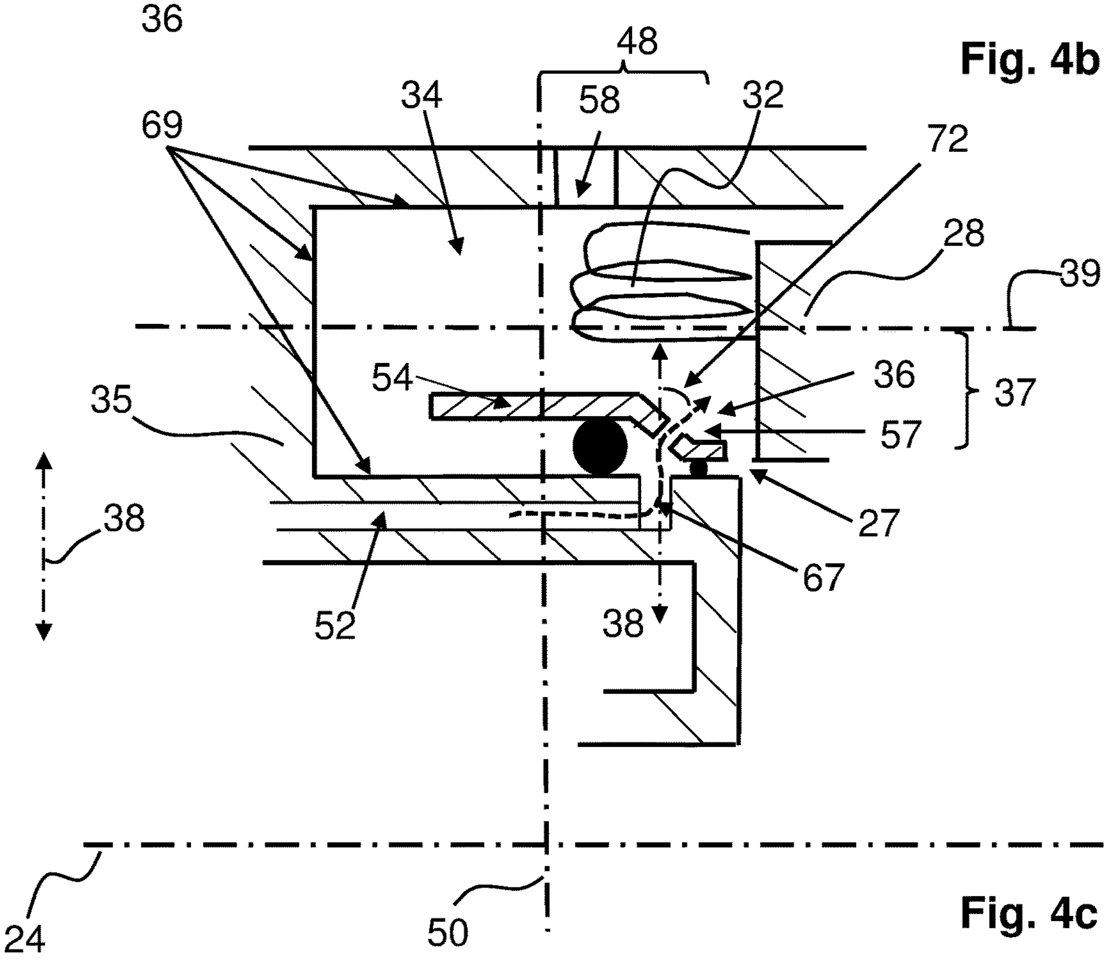

The cooling system 26 comprises the channel 34 and at least one inlet 36 to the channel 34 arranged at a radially inner portion of the channel 34 seen along a radial extension 38, see also FIGS. 4*a* and 4*b* and 4*c*. The radial extension 38 extends perpendicularly to the rotational axis 24.

Thus, during use of the electric rotating machine 4, the coolant will be directed into the channel 34 at a radial position close to the air gap 27. Since this is a portion of the coil end winding 32 with high losses, it ensured that the coolant will efficiently cool the coil end winding 32.

Figure 3:
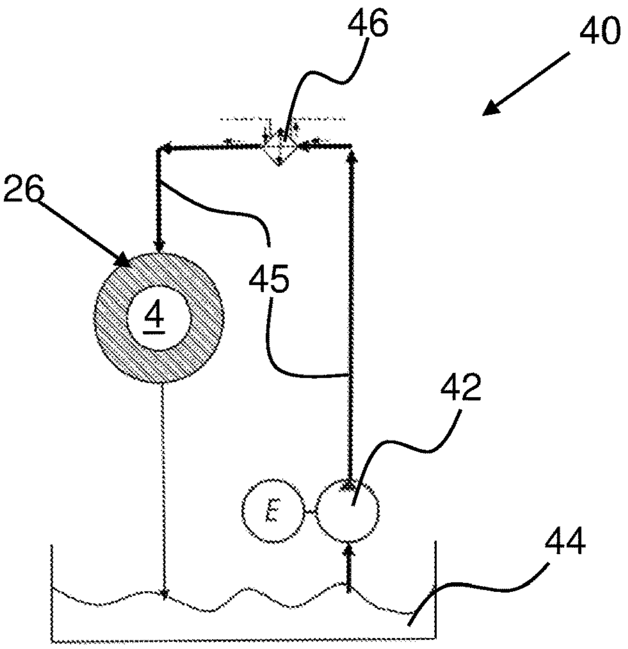

FIG. 3 schematically illustrates a cooling arrangement 40 according to embodiments. The cooling arrangement 40 is configured for cooling at least a portion of an electric rotating machine 4. The cooling arrangement 40 is presented as an example of an arrangement including the cooling system 26 discussed herein.

The cooling arrangement 44 comprises conduits 45. During operation of the cooling arrangement 40, a pump 42 is configured to pump coolant from a reservoir 44 via a heat exchanger 46 to the electric rotating machine 4 and back to the reservoir 44 via the conduits 45. The reservoir 44 forms a reservoir for coolant. In the heat exchanger 46, the coolant is cooled by a further fluid, such as ambient air or a water-based coolant.

In the electric rotating machine 4 the cooling arrangement 40 includes the cooling system 26 for cooling at least a coil end winding of a stator of the electric machine 4.

FIGS. 4*a* and 4*b* and 4*c* illustrate partial cross section through example embodiments of an electric rotating machine, such as the electric rotating machine 4 of FIG. 2.

As mentioned above and as more clearly shown in FIGS. 4*a* and 4*b* and 4*c*, the cooling system 26 comprises the channel 34 and the at least one inlet 36 to the channel 34 arranged at a radially inner portion 37 of the channel 34.

An axially extending line 39 indicates an example of a radial position within the channel 34, in relation to which radial position, the radially inner portion 37 of the channel 34 may be defined. The radially inner portion 37 is arranged radially inside the line 39. The radially inner portion 37 may be a radially inner quarter of the channel 34, or a radially inner third of the channel 34, or a radially inner half of the channel 34.

In the embodiments of FIGS. 4*a* and 4*c*, the at least one inlet 36 to the channel 34 is arranged at a radially inner side of the channel 34. That is, the inlet 36 extends into the channel 34 from a position radially inside the channel 34. Put differently, the at least one inlet 36 is arranged along an inner circumference of the channel 34.

In the embodiments of FIG. 4*b*, the at least one inlet 36 to the channel 34 is arranged at an axial side of the channel 34. That is, the inlet 36 extends into the channel 34 from a position axially outside the channel 34. Put differently, the at least one inlet 36 is arranged along an axial circumference of the channel 34.

In the embodiments of FIGS. 4*a* and 4*b* and 4*c*, the at least one inlet 36 to the channel 34 is arranged at the radially inner portion 37 of the channel 34.

In the embodiments of FIGS. 4*a* and 4*c*, the at least one inlet 36 to the channel 34 may be arranged at an axial half 48 of the channel 34 closest to the stator core 28.

Thus, during use of the electric machine 4, the coolant may be directed into a portion of the channel 34 closest to the air gap 27. Accordingly, an efficient cooling of the end winding 32 may be ensured.

In FIGS. 4*a* and 4*c* a line 50 indicates an axial centerline of the channel 34, in relation to which the axial half 48 of the channel 34 closest to the stator core 28 may be defined.

With reference to FIGS. 4*a* and 4*b* and 4*c*, the cooling system 26 may comprise one or more passages 52 arranged upstream of the channel 34. The at least one inlet 36 to the channel 34 may be fluidly connected to the one or more passages 52. One or more further conduits, passages, paths, and the like may be arranged upstream the one or more passages 52, in order to enable a coolant flow through the cooling system 26 to the one or more passages 52. A variety of such further conduits, passages, paths and the like are known in the prior art and will not be described in detail herein.

According to some embodiments, the one or more passages 52 may be arranged at least partially along the channel 34. In this manner, the one or more passages 52 may be arranged e.g., radially inside the channel 34 for directing the coolant to the at least one inlet 36 close to the stator core 28, as in the FIG. 4*a* embodiments, and/or at an axial portion of the channel 34, as differently exemplified in the embodiments of FIGS. 4*a* and 4*b* and 4*c*.

According to some embodiments, the one or more passages 52 may be formed between a first guiding member 54 and a second guiding member 56. The channel 34 may be partially delimited by the first guiding member 54. In this manner, the one or more passages 52 may be provided in a convenient manner radially inside the channel 34 in the electric machine, see FIG. 4*a*. See further below with reference to FIGS. 5*a*-5*g*.

According to some embodiments, the one or more passages 52 may be formed as channels in an annular wall section 69 of the housing 35. With reference to FIG. 4*c*, the one or more passages 52 in the annular wall section 69 may be fluidly connected to the at least one inlet 36, as will be explained in more detail in the following. The one or more passages 52 may be fluidly connected to an annular recess 67 in the annular wall section 69. The coolant may thus be distributed circumferentially along the annular recess 67 and further radially outwards from the recess in a direction away from the rotational axis 24. The coolant is thereby directed radially outwards towards the first guiding member 54, which may be ring-shaped and thereby arranged coaxially outside the annular recess 67. The first guiding member 54 may then guide the coolant into the channel 34 via through holes 57 comprised in the guiding member 54.

The first guiding member 54 may have a radius which is larger than the radius of an annular wall section 69 comprising the annular recess 67, seen along the radial extension 38.

Thereby the ring-shaped first guiding member 54 may be arranged coaxially outside the annular wall section 69.

Further, annular tubelike sealings 71 may provide a fluidly tight fitting of the first guiding member to the annular wall section 69.

According to example embodiments, the one or more through holes 57 of the first guiding member 54 may be configured to direct a coolant flow out from the through hole 57 with an angle 72 relative the radial extension 38. For example, this may be achieved with wall sections of the through hole 57 having an angle relative the radial extension 38. Alternatively, the one or more through holes 57 may be arranged along the circumference of a conical portion 65 of the first guiding member 54, see FIG. 5*g*. The conical portion 65 may have a radius which is decreasing along an axial direction towards the stator core 28. Thereby the conical portion 65 comprising the one or more through holes 57 may be directed towards a portion of the coil end winding being 32 closest to the stator core 28.

In FIGS. 4*a* and 4*b* and 4*c*, a flow path of the coolant through the one or more passages 52 and the at least one inlet 36 during use of the electric machine is indicated with a broken line arrow.

With reference to FIGS. 4*a* and 4*b* and 4*c*, the cooling system 26 may comprise at least one outlet 58 from the channel 34 arranged at a radially outer portion of the channel 34 seen along the radial extension 38. Thus, the coolant may flow generally radially outwardly through the channel 34 i.e., generally from a warmest region of the end winding 32 towards a coolest region thereof.

The at least one outlet 58 may be arranged at an upper portion of the channel 34, seen with the electric rotating machine 4 positioned in a use position thereof i.e., as shown in FIGS. 2, 4*a*, and 4*b* and 4*c*. In this manner, gravity may assist in filling the channel 34 with coolant as the coolant has to be pumped through the channel 34 against the force of gravity to reach the at least one outlet 58.

For instance, the pump 42 of the cooling arrangement 40 discussed with reference to FIG. 3 may be configured for pumping coolant through the channel 34 e.g., against the force of gravity.

The use position is a position in which the electric machine is mounted in e.g., a vehicle and with the vehicle standing one a surface to be travelled by the vehicle.

The coil end winding 32 may be arranged at the radially inner portion 37 of the channel 34. This means that the end winding 32 may be arranged in the radially inner portion 37 of the channel 34 but also may extend radially outside the radially inner portion 37 of the channel 34.

The channel 34 may extend radially outside the coil end winding 32. Thereby an unblocked portion 60 of the channel 34 may be formed radially outside of the coil end winding 32 seen along the radial extension 38. The unblocked portion 60 may extend at least partially circumferentially around the coil end winding 32. Accordingly, the unblocked portion 60 may form an at least partially circumferential flow path 61 in the channel 34.

Thus, there may be provided an at least partially circumferential flow path 61 to the outlet 58 radially outside the end winding. The coolant that has passed through the coil end winding 32 accordingly, may flow with a lower flow resistance in the unblocked portion 60 than within the coil end winding 32 to the at least one outlet 58.

There may be provided more than one outlet 58 for the coolant. Accordingly, either a fully circumferential flow path 61 has more than one outlet or a number of partially circumferential flow paths 61 have one or more outlets each.

Figure 5A:
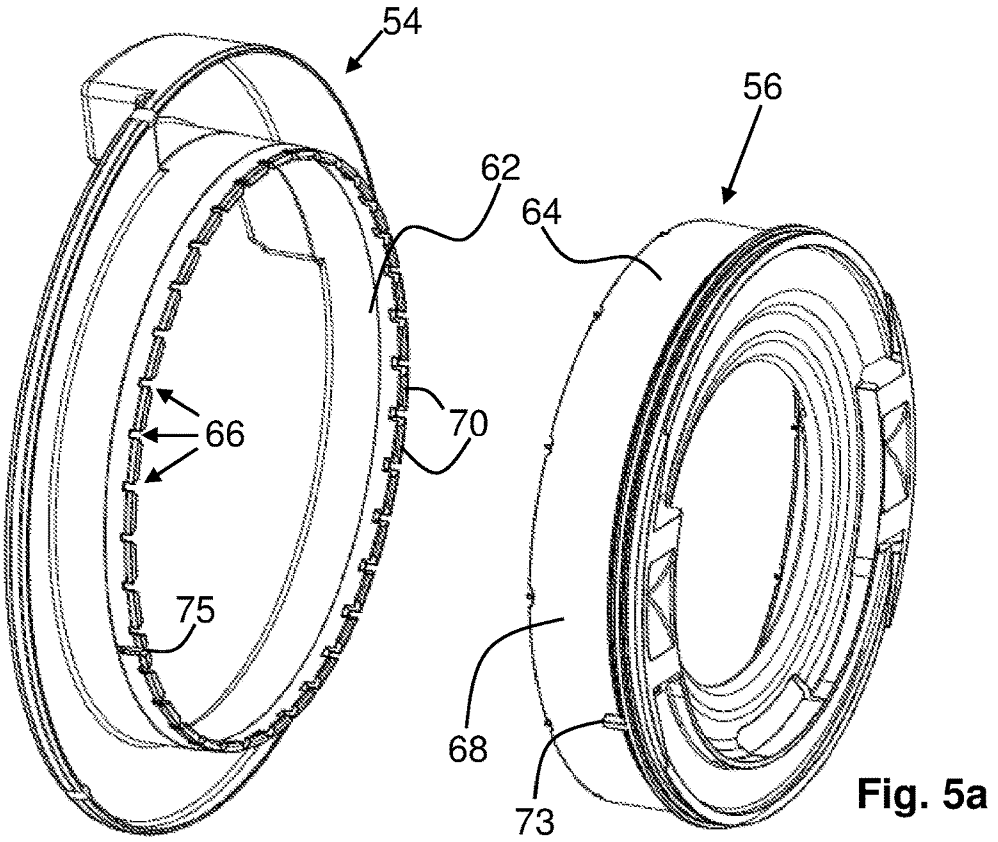
FIGS. 5*a*-5*g* illustrate first and second guiding members.
Figure 5B:
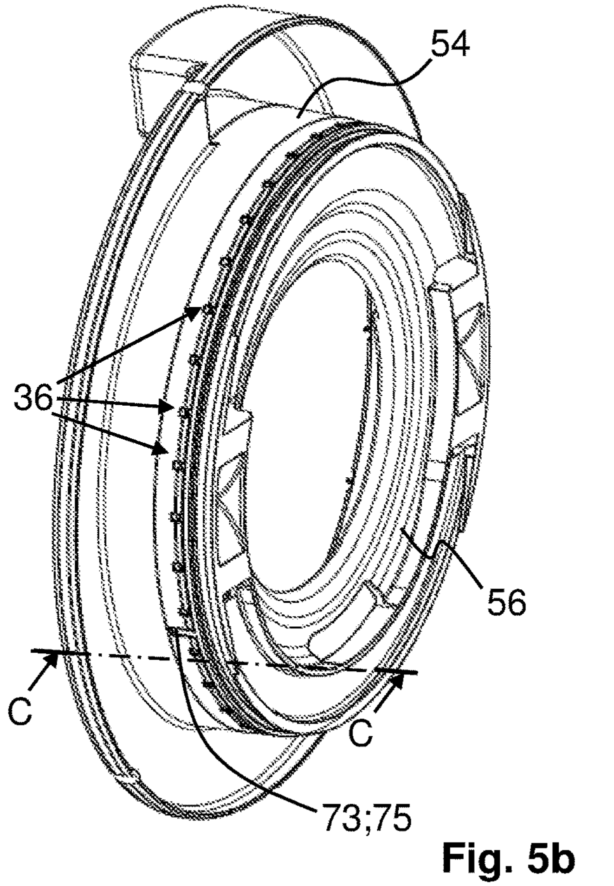
Figure 5C:
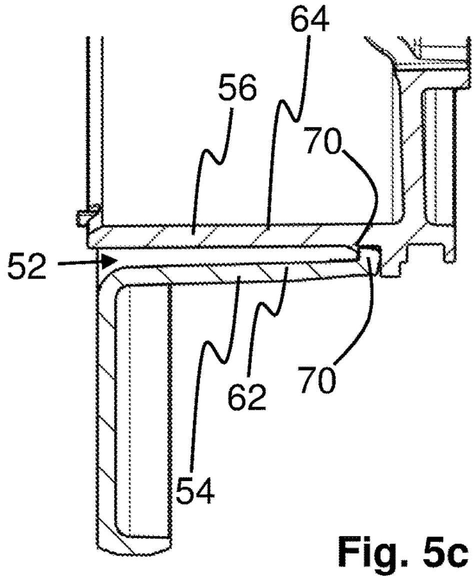

FIGS. 5*a*-5*c* illustrate first and second guiding members 54, 56 configured for forming one or more passages 52 in a cooling system. The cooling system may be a cooling system 26 as discussed above with reference to FIGS. 2-4*a*.

In FIG. 5*a*, the first and second guiding members 54, 56 are shown separated from each other. That is, in a manner as before assembly of the first and second guiding members 54, 56 to form the passage 52. In FIGS. 5*b*-5*c*, the first and second guiding members 54, 56 are shown assembled coaxially to form the passage 52. FIG. 5*c* shows a cross section along line C-C in FIG. 5*b*. In the following reference is made to FIGS. 5*a*-5*c*.

In the cooling system, the channel 34 may border to the first guiding member 54, see FIG. 4*a*.

Figure 5G:
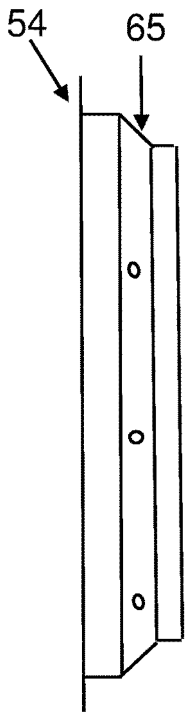

Between the first and second guiding members 54, 56, there are formed one or more passages 52. The first and second guiding members 54, 56 may comprise ring-shaped wall members 62, 64 to form therebetween the one or more passages 52. The ring-shaped wall member 62 of the first guiding member 54 has an inner diameter which is larger than the outer diameter of the ring-shaped wall member 64 of the second guiding member 56. Thereby, after assembly, the guiding member 54 fits on the outside of guiding member 56. Thus, after assembly, one or more passages 52 are formed between the ring-shaped wall members 62 and 64. The ring-shaped wall member 62 may have a conical section 65 as shown in FIG. 5*g*. The one or more passages 52 may be ring-shaped or partially ring-shaped, such as arc-shaped.

The at least one inlet 36 to the channel is fluidly connected to the one or more passages 52 and to the channel when the first and second guiding members 54, 56 are arranged in an electric rotating machine.

In the illustrated embodiments, the at least one inlet 36 to the channel 34 comprise more than one inlet 36. The inlets 36 are distributed along a circumference of the first guiding member 54. This means that when the first and second guiding members 54, 56 are arranged in the electric machine, the inlets 36 are arranged along an inner circumference of the channel 34.

Hence, during operation of the electric machine, to cool the coil end winding, the coolant is introduced in more than one circumferential position of the channel 34 and accordingly, to more than one circumferential position of the coil end winding.

According to example embodiments, the at least one inlet 36 to the channel may comprise within a range of 2-50 inlets 36 distributed along a circumference of the channel.

The at least one inlet 36 to the channel may be formed by one or more recesses 66 and/or through holes in the first guiding member 54.

In the illustrated embodiments, the first guiding member 54 is provided with a number of recesses 66, see e.g. FIG. 5*a*. A flange 68 of the second guiding member 56 is positioned against the first guiding member 54 at the recesses 66. Accordingly, through openings are formed, which through openings extend from the one or more passages 52 to the channel when the first and second guiding members 54, 56 are arranged in the electric machine. The through openings form the inlets 36.

The first and second guiding members 54, 56 may be connected to each other via a snap-fit connection. For this purpose, one or both of the ring-shaped wall members 62, 64 of the first and second guiding members 54, 56 may be provided with protrusions 70. The protrusions 70 of the respective wall members 62, 64 engage with each other when the first and second guiding members 54, 56 are assembled. Alternatively, one of the ring-shaped wall members 62, 64 may be provided with protrusions and the other the ring-shaped wall members 62, 64 may be provided with recesses. The protrusions of one of ring-shaped wall members 62, 64 engage with the recesses of the other of the ring-shaped wall member 62, 64 when the first and second guiding members 54, 56 are assembled.

The first and second guiding members 54, 56 may be rotationally locked in relation to each other. For instance, at axially extending, and each other facing, surfaces of the ring-shaped wall members 62, 64 may engage with each other to prevent the first and second guiding members 54, 56 from rotating in relation to each other.

Figure 5D:
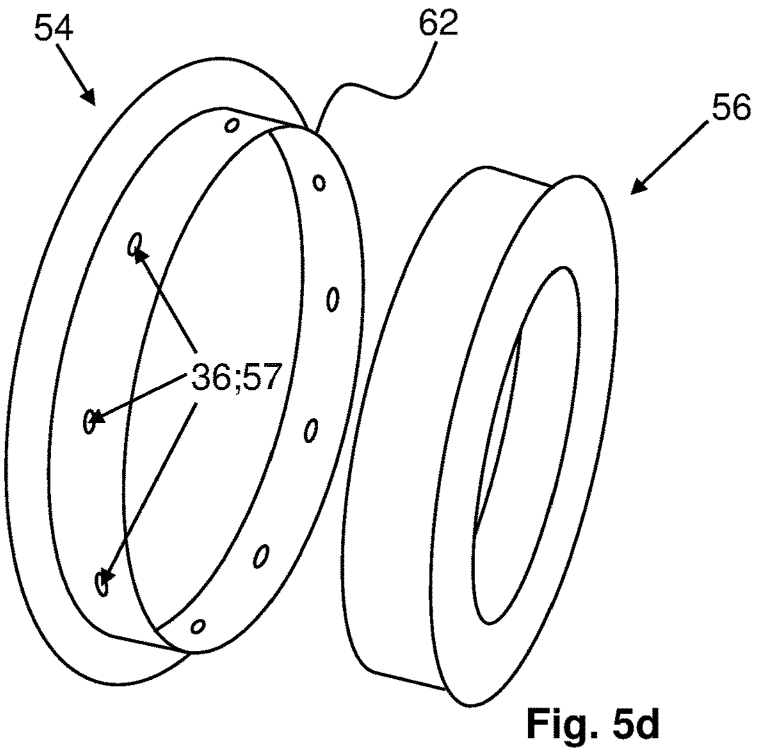
Figure 5E:
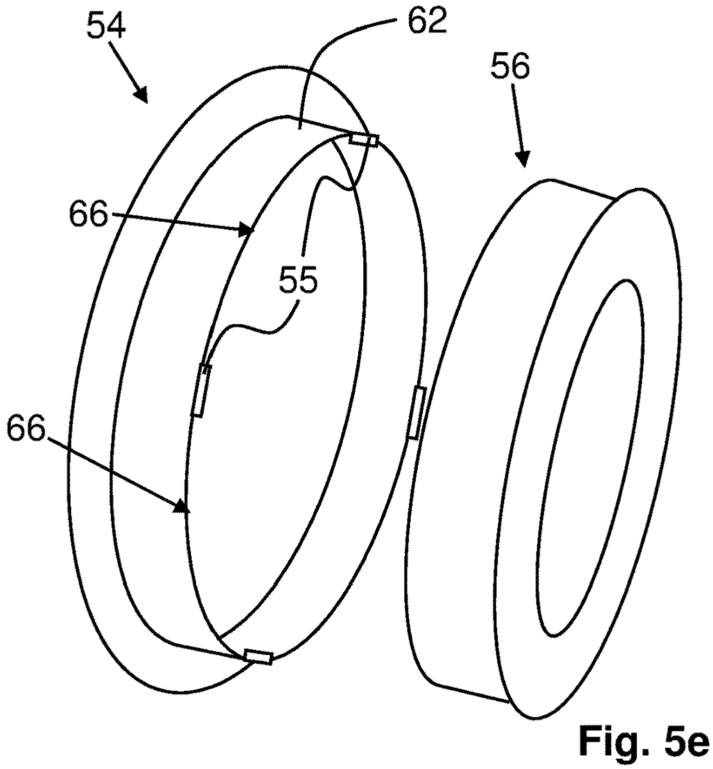
Figure 5F:
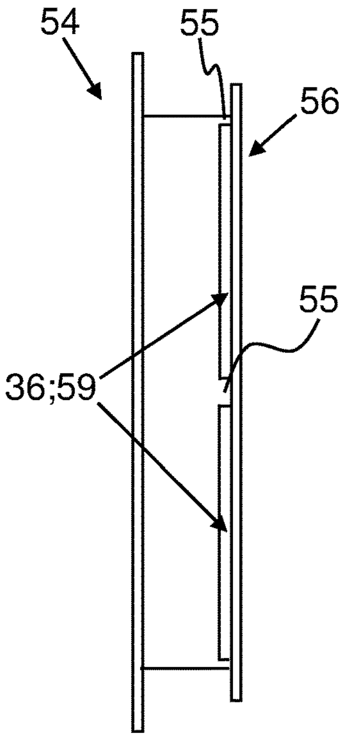

FIGS. 5*d*-5*f* illustrate alternative embodiments of first and second guiding members 54, 56 configured for forming one or more passages 52 in a cooling system. The cooling system may be a cooling system 26 as discussed above with reference to FIGS. 2-4*a*.

These embodiments resemble in much the embodiments of FIGS. 5*a*-5*c*. Accordingly, in the following mainly the differentiating features will be discussed.

In FIG. 5*d*, the first and second guiding members 54, 56 are shown separated from each other.

In these embodiments, the at least one inlet 36 is formed by one or more through holes 57. The through holes 57 extend through the ring-shaped wall member 62 of the first guiding member 54.

One or more of the through holes 57 may be arranged in an axial midportion of the ring-shaped wall member 62, as shown in FIG. 5*d*. Alternatively, one or more of the through holes 57 may be arranged axially towards the air gap between the stator and rotor and/or axially remote from the air gap.

In the embodiments of FIGS. 5*e* and 5*f*, the at least one inlet 36 is formed by four slot-shaped openings 59 formed between the first and second guiding members 54, 56. In FIG. 5*e*, again, the first and second guiding members 54, 56 are shown separated from each other. In FIG. 5*f*, the first and second guiding members 54, 56 are shown assembled coaxially to form the passage 52.

The ring-shaped wall member 62 of the first guiding member 54 is provided with long recesses 66 between protrusions 55. The protrusions 55 abut against the second guiding member 56 to provide the distance between the first and second guiding members 54, 56 that allows the recesses 66 to form the slot-shaped openings 59.

The number of slot-shaped openings 59 may be different than four, such as less than four or more than four.

Figure 6:
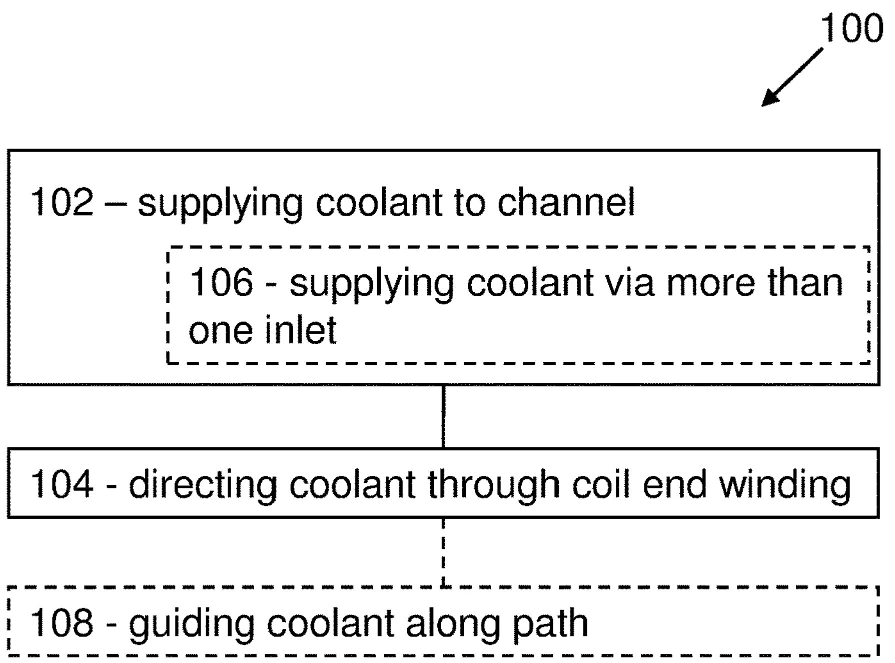
FIG. 6 illustrates embodiments of a method for cooling a coil end winding of an electric rotating machine.

FIG. 6 illustrates embodiments of a method 100 for cooling a coil end winding of an electric rotating machine. The electric rotating machine may be an electric rotating machine 4 as discussed above with reference to FIGS. 2-5*c*. Accordingly, in the following reference is also made to FIGS. 2-5*c*.

Accordingly, the electric machine 4 comprises a stator 20, a rotor 22 arranged to rotate about a rotational axis 24 in relation to the stator 20, and a cooling system 26 for cooling at least the coil end winding 32. The stator 20 comprises a stator core 28 and a stator coil 30, the stator coil 30 comprising the coil end winding 32 which extends axially beyond the stator core 28. At least part of the coil end winding 32 is arranged in a channel 34 extending at least partially around the rotational axis 24 The cooling system 26 comprises the channel 34.

The method 100 comprises steps of:

supplying 102 a coolant to the channel 34 at a radially inner portion of the channel 34, and directing 104 the coolant radially outwardly through the coil end winding 32.

According to embodiments, the step of supplying 102 a coolant may comprise a step of:

supplying 106 the coolant via more than one inlet 36 to the channel 34 at the radially inner portion of the channel 34. In this manner, the coolant may be supplied to the end winding in more than one circumferential position of the channel. Thus, cooling of the coil end winding may be further improved.

According to embodiments, the method 100 may comprise, subsequently to the step of directing 104 the coolant, a step of:

guiding 108 the coolant along an at least partially circumferential flow path 61 in the channel 34 radially outside the coil end winding 32 to at least one outlet 58 from the channel 34. In this manner, after the coolant as flowed through the coil end winding 32, the coolant may be conducted with low flow resistance along the at least partially circumferential flow path 61 to the at least one outlet 58. The at least partially circumferential flow path 61 may be formed by an unblocked portion 60 of the channel 34 as discussed above with reference to FIG. 4.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. An electric rotating machine, comprising a stator, a rotor arranged to rotate about a rotational axis in relation to the stator, and a cooling system for cooling at least a portion of the stator, wherein a radial extension extends perpendicularly to the rotational axis, wherein the stator comprises a stator core and a stator coil, the stator coil having a coil end winding extending axially beyond the stator core, wherein at least part of the coil end winding is arranged in a channel extending at least partially around the rotational axis, and wherein the cooling system comprises the channel and at least one inlet to the channel arranged at a radially inner portion of the channel seen along the radial extension, wherein the cooling system comprises one or more passages arranged upstream of the channel, where upstream of the channel is a position before the channel as seen along a flow direction of the coolant in the cooling system, wherein the at least one inlet to the channel is fluidly connected to the one or more passages, wherein the one or more passages is/are formed between a first guiding member and a second guiding member, wherein the first and second guiding members comprise ring-shaped wall members to form therebetween the one or more passages and wherein the channel is partially delimited by the first guiding member, and wherein the at least one inlet to the channel is formed by one or more recesses or through holes in the first guiding member.

2. The electric rotating machine according to claim 1, wherein the at least one inlet to the channel is arranged at an axial half of the channel closest to the stator core, wherein a line indicates an axial centerline of the channel, in relation to which the axial half of the channel closest to the stator core is defined.

3. The electric rotating machine according to claim 1, wherein the at least one inlet to the channel comprises more than one inlet distributed along a circumference of the channel.

4. The electric rotating machine according to claim 1, wherein the at least one inlet to the channel comprises within a range of 2-50 inlets distributed along a circumference of the channel.

5. The electric rotating machine according to claim 1, wherein the cooling system comprises at least one outlet from the channel arranged at a radially outer portion of the channel seen along the radial extension.

6. The electric rotating machine according to claim 5, wherein the at least one outlet is arranged at an upper portion of the channel, seen with the electric rotating machine positioned in a use position thereof, wherein the use position is a position in which the electric machine is mounted in a vehicle.

7. The electric rotating machine according to claim 1, wherein the coil end winding is arranged at the radially inner portion of the channel, and wherein the channel extends radially outside the coil end winding, forming in the channel an unblocked portion of the channel radially outside of the coil end winding seen along the radial extension, the unblocked portion extending at least partially circumferentially around the coil end winding.

8. A method for cooling a coil end winding of an electric rotating machine, the electric machine comprising a stator, a rotor arranged to rotate about a rotational axis in relation to the stator, and a cooling system for cooling at least the coil end winding, wherein radial extension extends perpendicularly to the rotational axis, wherein the stator comprises a stator core and a stator coil, the stator coil comprising the coil end winding which extends axially beyond the stator core, wherein at least part of the coil end winding is arranged in a channel extending at least partially around the rotational axis, wherein the cooling system comprises the channel and at least one inlet to the channel arranged at a radially inner portion of the channel seen along the radial extension, wherein the cooling system comprises one or more passages arranged upstream of the channel, where upstream of the channel is a position before the channel as seen along a flow direction of the coolant in the cooling system, wherein the at least one inlet to the channel is fluidly connected to the one or more passages, wherein the one or more passages is/are formed between a first guiding member and a second guiding member, wherein the first and second guiding members comprise ring-shaped wall members to form therebetween the one or more passages and wherein the channel is partially delimited by the first guiding member, wherein the at least one inlet to the channel is formed by one or more recesses or through holes in the first guiding member, and wherein the method comprising steps of:

supplying a coolant to the channel at a radially inner portion of the channel; and directing the coolant radially outwardly through the coil end winding.

9. The method according to claim 8, wherein the step of supplying a coolant comprises a step of:

supplying the coolant via more than one inlet to the channel at the radially inner portion of the channel.

10. The method according to claim 8, comprising subsequently to the step of directing the coolant a step of:

guiding the coolant along an at least partially circumferential flow path in the channel radially outside the coil end winding to at least one outlet from the channel.

11. A vehicle comprising one or more electric rotating machines, wherein the one or more electric rotating machines comprises a stator, a rotor arranged to rotate about a rotational axis in relation to the stator, and a cooling system for cooling at least a portion of the stator, wherein a radial extension extends perpendicularly to the rotational axis, wherein the stator comprises a stator core and a stator coil, the stator coil having a coil end winding extending axially beyond the stator core, wherein at least part of the coil end winding is arranged in a channel extending at least partially around the rotational axis, and wherein the cooling system comprises the channel and at least one inlet to the channel arranged at a radially inner portion of the channel seen along the radial extension, wherein the cooling system comprises one or more passages arranged upstream of the channel, where upstream of the channel is a position before the channel as seen along a flow direction of the coolant in the cooling system, wherein the at least one inlet to the channel is fluidly connected to the one or more passages, wherein the one or more passages is/are formed between a first guiding member and a second guiding member, wherein the first and second guiding members comprise ring-shaped wall members to form therebetween the one or more passages and wherein the channel is partially delimited by the first guiding member, and wherein the at least one inlet to the channel is formed by one or more recesses or through holes in the first guiding member.

* * * * *